United States Patent [19]

Willcox et al.

[11] Patent Number: 4,574,134
[45] Date of Patent: Mar. 4, 1986

[54] ANTIHAZE COMPOSITIONS AND PROCESS

[75] Inventors: Kenneth W. Willcox; Kenneth R. Mills, both of Bartlesville, Okla.

[73] Assignee: Phillips Petroleum Company, Bartlesville, Okla.

[21] Appl. No.: 669,907

[22] Filed: Nov. 9, 1984

[51] Int. Cl.$^4$ .......................... C08K 5/17; C08K 5/20; C08K 5/42; C08L 9/06

[52] U.S. Cl. ............................. 524/157; 524/158; 524/159; 524/161; 524/166; 524/231; 524/232; 524/245; 524/429; 524/913

[58] Field of Search ............... 524/429, 157, 158, 159, 524/161, 166, 231, 232, 245, 913

[56] References Cited

U.S. PATENT DOCUMENTS

| | | | |
|---|---|---|---|
| 3,223,695 | 12/1965 | Gallaugher | 524/252 |
| 3,400,094 | 9/1968 | Testa | 524/231 |
| 3,468,702 | 9/1969 | Gallaugher et al. | 428/341 |
| 3,592,794 | 7/1971 | Drake et al. | 524/421 |
| 3,639,517 | 2/1972 | Kitchen et al. | 525/92 |
| 3,644,310 | 2/1972 | Hopkins | 524/160 |
| 3,717,577 | 2/1973 | Moon | 524/421 |
| 3,891,587 | 6/1975 | Watts | 524/231 |
| 3,922,249 | 11/1975 | Mills | 524/120 |
| 4,091,053 | 5/1978 | Kitchen | 525/98 |
| 4,267,284 | 5/1981 | Kitchen | 525/99 |
| 4,370,437 | 1/1983 | Willcox et al. | 524/397 |
| 4,405,745 | 9/1983 | Mathis et al. | 524/429 |

FOREIGN PATENT DOCUMENTS

| | | | |
|---|---|---|---|
| 53-58568 | 5/1978 | Japan | 524/245 |
| 58-65737 | 4/1983 | Japan | 524/245 |

Primary Examiner—Ronald W. Griffin
Attorney, Agent, or Firm—S. E. Reiter

[57] ABSTRACT

The addition of at least one anti-haze agent selected from the group consisting of saturated fatty acid amides, unsaturated fatty acid amides, unsaturated fatty acid amides, tertiary alkanolamines, hydrocarbyl sulfates and alkyl benzene sulfonates to a nitrite-containing copolymer of a conjugated diene and a monovinyl-substituted aromatic hydrocarbon monomer provide novel compositions which give reduced haze formation when subjected to molding conditions.

27 Claims, No Drawings

ANTIHAZE COMPOSITIONS AND PROCESS

BACKGROUND

This invention relates to polymer compositions. In another aspect the invention relates to a process for reducing haze formation in molding compositions when subjected to molding compositions.

Associated with the fabrication of articles from copolymers formed from (1) monovinyl-substituted aromatic hydrocarbon monomer and (2) a conjugated diene monomer are the problems of gel and/or fisheye formation. It is known in the art to add small amounts of alkali metal nitrite to the copolymer to suppress gel and/or fisheye formation.

When alkali metal nitrite-containing copolymer is subjected to molding conditions, such as for example, injection molding, the resulting article displays a reduced level of gel and/or fisheye formation compared to copolymer without added alkali metal nitrite, but unfortunately has an undesirable level of haze.

OBJECTS OF THE INVENTION

An object of the invention is a process for the reduction of haze formation upon molding of copolymers comprising monovinyl-substituted aromatic hydrocarbon monomer and conjugated diene monomer.

Another object of the invention is copolymer compositions which exhibit reduced haze formation when used in molding applications.

These and other objects will be made apparent from a study of this disclosure and the appended claims.

STATEMENT OF THE INVENTION

In accordance with the present invention, we have discovered that haze formation in conjugated diene/monovinyl-substituted aromatic copolymer molding compositions subjected to molding conditions can be reduced by addition to the molding composition of at least one antihaze agent selected from the group consisting of:
 (a) saturated fatty acid amides,
 (b) unsaturated fatty acid amides,
 (c) tertiary alkanolamines,
 (d) hydrocarbyl sulfates, and
 (e) alkylbenzene sulfonates.

More specifically, conjugated diene/monovinyl-substituted aromatic copolymers, when treated with at least one nitrite compound to suppress fisheye formation which occurs when the copolymer is subjected to molding conditions, can be further treated to suppress stress induced crystallization of the added nitrite compound, and thereby reduce the haze produced as a result of nitrite crystallization. The further treatment contemplated by this invention consists essentially of adding at least one antihaze agent from the group of such agents noted above to the copolymer.

DETAILED DESCRIPTION OF THE INVENTION

Thus, in accordance with the present invention, compositions are provided comprising conjugated diene/monovinyl-substituted aromatic copolymer, at least one nitrite-containing compound and at least one antihaze agent.

In accordance with another embodiment of the invention, a process is provided for reducing haze formation in a conjugated diene/monovinyl-substituted aromatic copolymer containing at least one nitrite compound, said process comprising adding at least one antihaze agent from the group of such agents noted above.

POLYMER

The polymer to be employed in accordance with this invention is a random, linear or radial block copolymer of a conjugated diene and a monovinyl-substituted aromatic hydrocarbon. It is preferred that the monovinyl-substituted aromatic hydrocarbon monomer content of the copolymer range from about 10 to about 90 weight percent based on the total weight of the copolymer. U.S. Pat. Nos. 3,639,517 (Kitchen and Szalla) and 4,091,053 (Kitchen) disclose the preparation of some resinous block copolymers suitable for use in the practice of this invention. The disclosures of these U.S. patents are incorporated by reference into this disclosure.

Conjugated dienes contemplated to be within the scope of the present invention have from about 4 up to about 12 carbon atoms per molecule, while preferred conjugated dienes have from about 4 up to about 8 carbon atoms per molecule.

Examples of conjugated dienes that may be employed as monomers in the preparation of a suitable copolymer are 1,3-butadiene, isoprene, 2,3-dimethyl-1,3-butadiene, piperylene, 3-butyl-1,3-octadiene and 2-phenyl-1,3-butadiene, and the like and mixtures of any two or more thereof.

Monovinyl-substituted aromatic hydrocarbons contemplated to be within the scope of the present invention have from about 8 up to about 18 carbon atoms per molecule.

Examples of suitable monovinyl-substituted aromatic hydrocarbon monomers include styrene, 3-methylstyrene, 4-n-propylstyrene, 4-cyclohexylstyrene, 4-dodecylstyrene, 2-ethyl-4-benzylstyrene, 4-p-pphenylstyrene, 4-(4-phenyl-n-butyl)styrene, 1-vinylnaphthalene and 2-vinylnaphthalene, and the like and mixtures of any two or more thereof.

The currently preferred polymer is a resinous linear or radial butadiene-styrene block copolymer that comprises from about 5 to about 30 weight percent polymerized 1,3-butadiene and from about 95 to about 70 weight percent polymerized styrene with the copolymer having a melt flow in the range of about 0.5 to about 20 g/10 min as determined by ASTM D 1238-65T, condition G. Particularly preferred polymers which satisfy the above criteria are available from Phillips Chemical Company under the trade name K-Resin ® polymers.

NITRITE

The nitrites to be used in the practice of this invention are compounds having the formula $$M(NO_2)_m$$

where M is the ammonium ion, an alkali metal or an alkaline earth metal. The value for m is 1 when M is the ammonium ion or an alkali metal and 2 when M is an alkaline earth metal. Useful metal nitrites are those which are at least partly soluble in water and are derived from the metals of Groups IA and IIA of the Periodic Table of Elements specific examples of useful nitrites include sodium nitrite, lithium nitrite, potassium nitrite, ammonium nitrite, barium nitrite, calcium nitrite and strontium nitrite. Sodium nitrite is presently preferred because it is inexpensive and readily available.

ANTIHAZE AGENT

Antihaze agents contemplated to be within the scope of the present invention are selected from the group consisting of:
(a) saturated fatty acid amides,
(b) unsaturated fatty acid amides,
(c) tertiary alkanolamines,
(d) hydrocarbyl sulfates, and
(e) alkylbenzene sulfonates.

Suitable saturated fatty acid amides in accordance with the invention have the formula:

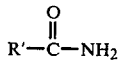
$$R'-\overset{O}{\underset{\|}{C}}-NH_2 \tag{I}$$

wherein R' is a saturated hydrocarbon radical having from 11 to about 23 carbon atoms.

Examples of group (a) antihaze agents include dodecanamide, octadecanamide (stearamide) which can be obtained commercially as Kemamides® S (sold by the Humko Chemical Division, Witco Chemical Corp., of Memphis, TN), docosanamide (Kemamides® E, Humko Chemical Co.), tetracosanamide, and the like and mixtures of any two or more thereof. A presently preferred member of this group is stearamide for its ready availability and good antihaze imparting properties.

Suitable unsaturated fatty acid amides in accordance with the invention have the formula:

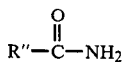
$$R''-\overset{O}{\underset{\|}{C}}-NH_2 \tag{II}$$

wherein R'' is a mono-unsaturated carbon redicel having from 11 to about 23 carbon atoms.

Examples of group (b) antihaze agents include lauramide, oleamide, erucamide, selacholamide(cis-15-tetracosenamide) and the like and mixtures of any two or more thereof.

Suitable tertiary alkanolamines in accordance with the invention have the formula

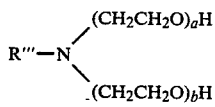
$$R'''-N\overset{\displaystyle(CH_2CH_2O)_aH}{\underset{\displaystyle(CH_2CH_2O)_bH}{}} \tag{III}$$

wherein R''' is an alkyl group having from about 7 up to about 20 carbon atoms; wherein a≧1 and b≧1 with the proviso that a+b≦50.

Examples of group (c) antihaze agents include
N,N-bis(2-hydroxyethyl)-N-octylamine,
N,N-bis(2-hydroxyethyl)-N-octadecylamine,
N,N-bis[poly(oxyethylene)]-N-dodecylamine, and the like and mixtures of any two or more thereof. A presently preferred compound is Armostat® 410, available commercially from Noury Chemical Corporation, Burt, N.Y., which is shown in the literature to be a mixture of N,N-bis(2-hydroxyethyl)alkylamines, wherein R''' in structure (III) is a mixture of $C_7$–$C_{20}$ alkyls.

Suitable hydrocarbyl sulfates in accordance with the invention have the formula:

$$R^{iv}SO_3A \tag{IV}$$

wherein $R^{iv}$ is an alkyl, aryl, cycloalkyl, alkaryl or aralkyl radical having from about 9 up to about 21 carbon atoms and A is an alkali metal cation or the ammonium ion.

Examples of group (d) antihaze agents include potassium nonyl sulfate, sodium lauryl sulfate (preferred), ammonium phenyl sulfate, sodium benzyl sulfate, potassium octadecyl sulfate, and the like and mixtures of any two or more thereof.

Suitable alkylbenzenesulfonates in accordance with the invention have the formula

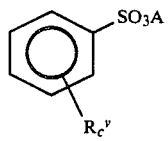

(V)

wherein $R^v$ is a branched chain or linear alkyl radical having from about 9 up to about 16 carbon atoms, A is as defined above and c is an integer from 1 to 3, inclusive; and mixtures of any two or more of the above group of antihaze agents.

Examples of group (e) antihaze agents include ammonium 2-methyloctylbenzenesulfonate, sodium laurylbenzenesulfonate, and the presently preferred member, potassium hexadecylbenzenesulfonate.

Concentrations of antihaze agent sufficient to reduce haze in the resinous copolymers containing a nitrite compound is dependent upon the chemical nature of the particular antihaze agent employed. Generally, the amount used is any effective amount which causes a reduction in haze formation. As a practical matter, at least about 10 parts per million of antihaze agent is employed, up to the following upper levels, expressed in parts per million (ppm) based on the weight of the total composition:
Group (a), (b) fatty acid amines—up to about 150 ppm
Group (c) alkanolamines—up to about 150 ppm
Group (d) hydrocarbyl sulfates—up to about 75 ppm
Group (e) alkylbenzenesulfonates—up to about 35 ppm

PROCESS

The nitrite compound and at least one antihaze agent can be admixed with the resin in any suitable manner such that, preferably, an even distribution is obtained. In one process the components, in finely divided form, can be compounded with the resin to form a concentrate which is subsequently mixed with virgin resin in an extruder or the like to obtain the desired composition. In another process the components can be dissolved in water and diluted with an alcohol such as ethanol to obtain a stock solution, e.g., a stock solution comprising 95 volume percent ethanol. Sufficient stock solution to wet the resin particles and to obtain the desired concentration of each of the components can then be employed. The wetted polymer, preferably in the form of particles or pellets, can be tumbled during or after the addition of the stock solution to improve distribution. Following this treatment, solvents are evaporated, for example by gentle heating, and the treated polymer can be processed into the desired articles.

A further understanding of the present invention and its advantages will be provided by reference to the following non-limiting examples.

EXAMPLE I

Samples were prepared by admixing 100 parts by weight of a commercially obtained, stabilized radical styrene-butadiene block copolymer containing about 76 weight percent polymerized styrene units and about 24 weight percent polymerized 1,3-butadiene units and the specified amounts of sodium nitrite and antihaze agents. The block copolymer is sold commercially as K-Resin® KRO3 resin, a product of Phillips Petroleum Co., Bartlesville, OK. A stock solution containing 0.12 g $NaNO_2$ dissolved in 50 mL of a mixture containing 2.5 mL of $H_2O$ and 47.5 mL of absolute ethanol was prepared. 5 mL of the stock solution was then admixed with 600 g of the resin pellets so as to obtain a mixture containing 20 ppm $NaNO_2$ based on the weight of resin and metal salt. When an antihaze agent was employed, a stock solution of it was first made by dissolving 0.6 g in 50 mL $H_2O$. When the antihaze concentration based on sample weight was 100 ppm, the sample was made by combining 5 mL of the antihaze stock solution with 5 mL of the $NaNO_2$ stock solution and admixing the mixture with 600 g of the resin pellets. The sample containing 50 ppm antihaze agent was made as before but decreasing the amount of antihaze stock solution used from 5 mL to 2.5 mL. Similarly, the sample containing 20 ppm antihaze agent was made as before but the amount of antihaze stock solution used was decreased from 5 mL to 1 mL. In all instances, the solvents were allowed to evaporate at ambient conditions in a fume hood. Each dry sample was extruded and pelletized and then injection molded into discs measuring 3 inches in diameter and 0.05 inches in thickness (7.6×0.13 cm) by employing a resin melt temperature of about 230° C., a mold temperature of about 50° C. and an injection pressure of about 45 MPa.

The present haze of each disc tested was determined according to ASTM D 1003 with conditioning of the discs modified as set forth in Table 1.

The results obtained are given in Table 1.

Control runs 1 and 2, when compared, show that 20 ppm $NaNO_2$ increases haze in injection molded discs regardless of the conditioning treatment afforded the discs prior to determining the haze. Conditioning the discs in moist air (run no. 2) causes appreciably increased haze.

The results in invention runs 3-5 show that haze tends to decrease in the concentration range of 20 to 100 ppm Kemamide S when compared to control run 2. The magnitude of improvement in haze formation tends to improve with increased antihaze agent concentration. The reason for the slightly poorer results in run 6 are not known. Results similar to invention runs 3-5 are noted in invention runs 6-8 in which the antihaze agent is Armostat 410 instead of Kemamide S.

EXAMPLE II

A series of samples was prepared with portions of the same lot of KRO3 resin used before containing 20 ppm $NaNO_2$ and either 200 or 300 ppm of each antihaze agent employed in Example I. Injection molded discs of each sample were prepared and tested for haze as described before. The results obtained show that all the samples containing $NaNO_2$ and antihaze agent developed more haze after conditioning than did the control sample containing only 20 ppm $NaNO_2$. The results indicate that 200 ppm of the antihaze agents tested is too great a concentration and suggest an upper limit of between 100 and 200 ppm, or about 150 ppm.

EXAMPLE III

A series of samples was prepared as before with portions of the same lot of KRO3 resin containing 20 ppm $NaNO_2$ and either 200 or 300 ppm of either sodium lauryl sulfate or sodium laurylbenzenesulfonate. Injection molded discs of each sample were prepared and tested for haze as described before. The results obtained show that all the samples developed more haze after conditioning than did the control. It is apparent that these antihaze agents do not reduce haze in the high concentration range employed.

EXAMPLE IV

A series of samples were prepared as before with portions of the same lot of KRO3 resin containing 20 ppm $NaNO_2$ and either 20, 50 or 100 ppm of one of the antihaze agents sodium lauryl sulfate and sodium laurylbenzenesulfonate.

Injection molded discs of each sample were prepared and tested for haze as described before. The results are presented in Table II.

TABLE 1

Effect of Antihaze Agent Concentration on Resin Haze

| | Run No. | | | | | | | |
|---|---|---|---|---|---|---|---|---|
| | 1 | 2 | 3 | 4 | 5 | 6 | 7 | 8 |
| | Control | Control | | | Invention | | | |
| KR03 ®, 100 parts by weight | 100 | 100 | 100 | 100 | 100 | 100 | 100 | 100 |
| $NaNO_2$, ppm | 0 | 20 | 20 | 20 | 20 | 20 | 20 | 20 |
| KAS[a], ppm | 0 | 0 | 20 | 50 | 100 | 0 | 0 | 0 |
| A410[b], ppm | 0 | 0 | 0 | 0 | 0 | 20 | 50 | 100 |
| Haze, % after molding[c] | 2.7 | 3.4 | 3.0 | 3.4 | 2.9 | 3.2 | 3.0 | 3.1 |
| Haze, %, conditioning 1[d] | 3.3 | 3.9 | 3.7 | 4.0 | 3.4 | 3.8 | 3.6 | 3.5 |
| Haze, %, conditioning 2[e] | 3.6 | 5.0 | 4.5 | 5.1 | 4.5 | 4.6 | 4.2 | 4.2 |

[a]KAS is Kemamide S.
[b]A410 is Armostat 410.
[c]Haze determined within several hours after molding.
[d]Specimens conditioned for 48 hours at ambient conditions.
[e]Specimens conditioned for 24 hours at room temperature in 100% relative humidity, then set for 6-8 hours at ambient conditions.

TABLE II

| | Certain Sodium-Containing Surfactants as Antihaze agents | | | | | | | |
|---|---|---|---|---|---|---|---|---|
| | Run No. | | | | | | | |
| | 1 Control | 2 Control | 12 Invention | 13 | 14 Comparison | 15 Invention | 16 | 17 Comparison |
| KR03, 100 parts by weight | 100 | 100 | 100 | 100 | 100 | 100 | 100 | 100 |
| NaNO$_2$, ppm | 0 | 20 | 20 | 20 | 20 | 20 | 20 | 20 |
| SLS$^{(a)}$, ppm | 0 | 0 | 20 | 50 | 100 | 0 | 0 | 0 |
| SLRS$^{(b)}$, ppm | 0 | 0 | 0 | 0 | 0 | 20 | 50 | 100 |
| Haze, %, after molding$^{(c)}$ | 2.7 | 3.4 | 3.1 | 3.3 | 3.5 | 3.1 | 3.5 | 3.7 |
| Haze, %, conditioning 1$^{(d)}$ | 3.3 | 3.9 | 3.7 | 3.5 | 3.9 | 3.8 | 3.8 | 4.5 |
| Haze, %, conditioning 2$^{(e)}$ | 3.6 | 5.0 | 4.7 | 4.9 | 5.2 | 4.3 | 5.1 | 5.3 |

Notes:
Runs 1 and 2 are repeated from Table 1.
$^{(a)}$SLS is sodium lauryl sulfate.
$^{(b)}$SLBS is sodium lauryl benzenesulfonates.
$^{(c)}$Haze determined within several hours after molding.
$^{(d)}$Specimens conditioned for 48 hours at ambient conditions.
$^{(e)}$Specimens conditioned for 24 hours at room temperature in 100% relative humidity, then set for 6–8 hours at ambient conditions.

The results in invention runs 12, 13 show that sodium lauryl sulfate (SLS) in concentrations ranging from 20 to 50 ppm. is effective in reducing haze in KRO3 containing 20 ppm NaNO$_2$. Comparison run 14 in which 100 ppm SLS is added slightly increases haze relative to control run 2. The upper limit for SLS appears to lie between 50 and 100 ppm, perhaps about 75 ppm.

The results in invention run 15 show that 20 ppm sodium lauryl benzenesulfonate (SLBS) is of value in reducing haze in KRO3 containing 20 ppm NaNO$_3$. The upper limit for SLBS appears to lie between 20 and 50 ppm, or about 35 ppm.

EXAMPLE V

A series of samples was prepared as before with portions of the same lot of KRO$_3$ containing 20 ppm NaNO$_2$ and 5 ppm of one of the following fluorochemical anionic and nonionic Fluorad ® surfactants available from 3M Company, St. Paul, MN. FC-99 (amine perfluoroalkylsulfonates), FC-120 (ammonium perfluoroalkylsulfonates), FC-129 (potassium fluorinated alkyl carboxylates), FC-135 (fluorochemical alkyl quarternary ammonium iodides), and FC-430 (nonionic fluorochemical liquid surfactant). Discs of each sample were prepared and evaluated for haze as before. None of the fluorochemical surfactants was effective in reducing haze of sodium nitrite-containing KRO3. Compositions containing 10 ppm of any of the named surfactants were very difficult to pelletize indicating too much surfactant was present.

The results obtained in this example demonstrate that the fluorochemical surfactants tested are not effective in suppressing haze in metal nitrite-containing KRO3 which has been injection molded to form various articles.

The examples have been provided merely to illustrate the practice of our invention and should not be read so as to limit the scope of our invention or the appended claims in any way. Reasonable variations and modifications, not departing from the essence and spirit of our invention, are contemplated to be within the scope of patent protection desired and sought.

We claim:

1. A molding composition consisting essentially of:
   (1) a copolymer of conjugated diene/monovinyl-substituted aromatic hydrocarbon monomer; wherein said conjugated diene has from 4 up to about 12 carbon atoms per molecule and said monovinyl-substituted aromatic hydrocarbon monomer has from 8 up to about 18 carbon atoms per molecule;
   (2) 0.1 to about 10 parts by weight per 100 parts copolymer of at least one compound having the formula $$M(NO_2)_m$$

where m=1 when M is the ammonium ion or an alkali metal, and m=2 when M is an alkaline earth metal; and
   (3) an amount of at least one antihaze agent sufficient to reduce haze in said composition when subjected to injection molding conditions, wherein said at least one antihaze agent is selected from the group consisting of:
   (a) saturated fatty acid amides of the formula $$R'-\overset{O}{\underset{\|}{C}}-NH_2$$

where R' is a saturated hydrocarbon radical having about 11 to about 23 carbon atoms,
   (b) unsaturated fatty acid amides of the formula $$R''-\overset{O}{\underset{\|}{C}}-NH_2$$

where R'' is a mono-unsaturated hydrocarbon radical having about 11 to about 23 carbon atoms,
   (c) tertiary alkanolamines of the formula $$R'''-N\begin{array}{c}(CH_2CH_2O)_aH\\ (CH_2CH_2O)_bH\end{array}$$

where R''' is an alkyl group having about 7 to about 20 carbon atoms, a≧1, b≧1, with the proviso that a+b>50,
   (d) hydrocarbyl sulfates of the formula $$R^{iv}SO_3A$$

where $R^{iv}$ is an alkyl, aryl, cycloalkyl, alkaryl or aralkyl radical having about 9 to about 21 carbon atoms and A is a cation selected from the group consisting of alkali metal cations and the ammonium ion, (e) alkylbenzenesulfonates of the formula

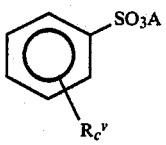

where $R^v$ is a branched chain or linear alkyl radical having about 9 to about 16 carbon atoms, c is an integer from 1-3 inclusive and A is as defined above, and mixtures of any two or more thereof.

2. A composition in accordance with claim 1 wherein said copolymer is a random copolymer.

3. A composition in accordance with claim 1 wherein said copolymer is a block copolymer.

4. A composition in accordance with claim 3 wherein said copolymer is a linear block copolymer.

5. A composition in accordance with claim 3 wherein said copolymer is a radial block copolymer.

6. A composition in accordance with claim 5 wherein said copolymer is a butadiene/styrene copolymer.

7. A composition in accordance with claim 1 wherein the monovinyl-substituted aromatic hydrocarbon monomer content of said copolymer ranges from about 10 to about 90 weight percent based on the total weight of copolymer.

8. A composition in accordance with claim 1 wherein the amount of said saturated fatty acid amide is at least about 10 parts per million and does not exceed about 150 parts per million based on total composition weight.

9. A composition in accordance with claim 8 wherein said saturated fatty acid amide is octadecanamide.

10. A composition in accordance with claim 1 wherein the amount of said unsaturated fatty acid amide is at least about 10 parts per million and does not exceed about 150 parts per million based on total composition weight.

11. A composition in accordance with claim 1 wherein the amount of said tertiary alkanolamine is at least about 10 parts per million and does not exceed about 150 parts per million based on total composition weight.

12. A composition in accordance with claim 11 wherein said tertiary alkanolamine is N,N-bis(2-hydroxyethyl)alkylamine and wherein the alkyl group is a $C_7$-$C_{20}$ alkyl.

13. A composition in accordance with claim 1 wherein the amount of said hydrocarbyl sulfate is at least about 10 parts per million and does not exceed about 75 parts per million based on total composition weight.

14. A composition in accordance with claim 13 wherein said hydrocarbyl sulfate is sodium lauryl sulfate.

15. A composition in accordance with claim 1 wherein the amount of said alkylbenzenesulfonate is at least about 10 parts per million and does not exceed about 35 parts per million based on total composition weight.

16. A composition in accordance with claim 15 wherein said alkylbenzenesulfonate is laurylbenzenesulfonate.

17. A process for reducing the formation of haze in a conjugated diene/monovinyl-substituted aromatic copolymer molding composition; wherein said copolymer is prepared from conjugated diene having from 4 to about 12 carbon atoms per molecule and monovinyl-substituted aromatic hydrocarbon monomer having from 8 up to about 18 carbon atoms per molecule; and wherein said molding composition further contains about 0.1 to about 10 parts by weight per 100 parts copolymer of at least one compound having the formula $$M(NO_2)_m$$

where m=1 when M is the ammonium ion or an alkali metal, and m=2 when M is an alkaline earth metal; said process comprising adding to said molding composition an amount of at least one antihaze agent sufficient to reduce haze in said composition when subjected to injection molding conditions, wherein said at least one antihaze agent is selected from the group consisting of:

(a) saturated fatty acid amides of the formula

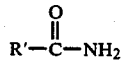

where R′ is a saturated hydrocarbon radical having about 11 to about 23 carbon atoms, (b) unsaturated fatty acid amides of the formula

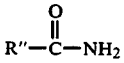

where R″ is a mono-unsaturated hydrocarbon radical having about 11 to about 23 carbon atoms, (c) tertiary alkanolamines of the formula

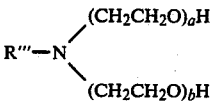

where R‴ is an alkyl group having about 7 to about 20 carbon atoms, $a \geq 1$, $b \geq 1$, with the proviso that $a - b \leq 50$, (d) hydrocarbyl sulfates of the formula $$R^{iv}SO_3A$$

where $R^{iv}$ is an alkyl, aryl, cycloalkyl, alkaryl or aralkyl radical having about 9 to about 21 carbon atoms and A is a cation selected from the group consisting of sodium, potassium and ammonium, (e) alkylbenzenesulfonates of the formula

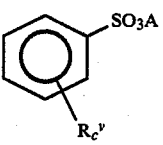

where $R^v$ is a branched chain or linear alkyl radical having about 9 to about 16 carbon atoms, c is an integer from 1-3 and A is as defined above, and mixtures of any two or more thereof.

18. A process in accordance with claim 17 wherein the amount of said saturated fatty acid amide is at least about 10 parts per million and does not exceed about 150 parts per million based on total composition weight.

19. A process in accordance with claim 18 wherein said saturated fatty acid amide is octadecanamide.

20. A process in accordance with claim 17 wherein the amount of said unsaturated fatty acid amide is at least about 10 parts per million and does not exceed about 150 parts per million based on total composition weight.

21. A process in accordance with claim 17 wherein the amount of said tertiary alkanolamine is at least about 10 parts per million and does not exceed about 150 parts per million based on total composition weight.

22. A process in accordance with claim 21 wherein said tertiary alkanolamine is N,N-bis(2-hydroxyethyl)alkylamine and wherein the alkyl group is a $C_7$-$C_{20}$ alkyl.

23. A process in accordance with claim 17 wherein the amount of said hydrocarbyl sulfate is at least about 10 parts per million and does not exceed about 75 parts per million based on total composition weight.

24. A process in accordance with claim 23 wherein said hydrocarbyl sulfate is sodium lauryl sulfate.

25. A process in accordance with claim 17 wherein the amount of said alkylbenzenesulfonate is at least about 10 parts per million and does not exceed about 35 parts per million based on total composition weight.

26. A process in accordance with claim 25 wherein said alkylbenzenesulfonate is laurylbenzenesulfonate.

27. In a process for injection molding a molding composition comprising
   (1) a copolymer of conjugated diene/monovinyl-substituted aromatic hydrocarbon monomer; wherein said conjugated diene has from 4 up to about 12 carbon atoms per molecule and said monovinyl-substituted aromatic hydrocarbon monomer has from 8 up to about 18 carbon atoms per molecule;
   (2) 0.1 to about 10 parts by weight per 100 parts copolymer of at least one nitrite compound having the formula

$M(NO_2)_m$ where m=1 when M is the ammonium ion or an alkali metal, and m=2 when M is an alkaline earth metal, the improvement comprises adding to said molding composition
   (3) an amount of at least one antihaze agent sufficient to reduce haze in said composition when subjected to injection molding conditions, wherein said at least one antihaze agent is selected from the group consisting of:
   (a) saturated fatty acid amides of the formula

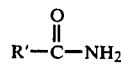

where R' is a saturated hydrocarbon radical having about 11 to about 23 carbon atoms,
   (b) unsaturated fatty acid amides of the formula

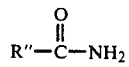

where R'' is a mono-unsaturated hydrocarbon radical having about 11 to about 23 carbon atoms,
   (c) tertiary alkanolamines of the formula

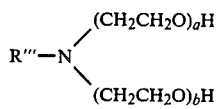

where R''' is an alkyl group having about 7 to about 20 carbon atoms, a a≧1, b≧1, with the proviso that a+b≦50,
   (d) hydrocarbyl sulfates of the formula

$R^{iv}SO_3A$ where $R^{iv}$ is an alkyl, aryl, cycloalkyl, alkaryl or aralkyl radical having about 9 to about 21 carbon atoms and A is a cation selected from the group consisting of sodium, potassium and ammonium,
   (e) alkylbenzenesulfonates of the formula

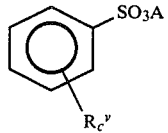

where $R^v$ is a branched chain or linear alkyl radical having about 9 to about 16 carbon atoms, c is an integer from 1-3 and A is as defined above, and mixtures of any two or more thereof.

* * * * *

UNITED STATES PATENT AND TRADEMARK OFFICE
CERTIFICATE OF CORRECTION

PATENT NO. : 4,574,134
DATED : March 4, 1986
INVENTOR(S) : Kenneth W. Willcox and Kenneth R. Mills It is certified that error appears in the above-identified patent and that said Letters Patent are hereby corrected as shown below:

Claim 1, line 59, after "a+b" and before "50", ">" should be ---$\underline{<}$---.

Signed and Sealed this

Nineteenth Day of August 1986

[SEAL]

Attest:

DONALD J. QUIGG

Attesting Officer

Commissioner of Patents and Trademarks